(12) United States Patent
Miscopein et al.

(10) Patent No.: US 8,842,598 B2
(45) Date of Patent: Sep. 23, 2014

(54) METHOD OF TRANSMITTING A COMMUNICATIONS SIGNAL

(75) Inventors: Benoît Miscopein, Grenoble (FR); Jean Schwoerer, Grenoble (FR); Jean-Marie Gorce, Massieux (FR)

(73) Assignee: France Telecom, Paris (FR)

( * ) Notice: Subject to any disclaimer, the term of this patent is extended or adjusted under 35 U.S.C. 154(b) by 212 days.

(21) Appl. No.: 13/000,880

(22) PCT Filed: Jun. 16, 2009

(86) PCT No.: PCT/FR2009/051145
§ 371 (c)(1),
(2), (4) Date: Dec. 22, 2010

(87) PCT Pub. No.: WO2010/007274
PCT Pub. Date: Jan. 21, 2010

(65) Prior Publication Data
US 2011/0110292 A1    May 12, 2011

(30) Foreign Application Priority Data
Jun. 23, 2008    (FR) ...................................... 08 54137

(51) Int. Cl.
| | |
|---|---|
| H04B 7/14 | (2006.01) |
| H04J 1/10 | (2006.01) |
| H04L 1/00 | (2006.01) |
| H04B 7/00 | (2006.01) |
| H04W 52/02 | (2009.01) |
| H04W 74/08 | (2009.01) |

(52) U.S. Cl.
CPC .......... H04W 52/0225 (2013.01); H04W 74/08 (2013.01)
USPC ............................ 370/315; 370/252; 455/500

(58) Field of Classification Search
CPC ........................... H04W 52/0225; H04W 74/08
USPC .................................... 455/500; 370/315, 252
See application file for complete search history.

(56) References Cited

U.S. PATENT DOCUMENTS

| | | | |
|---|---|---|---|
| 2007/0070983 A1* | 3/2007 | Redi et al. ..................... | 370/352 |
| 2010/0054182 A1 | 3/2010 | Bachir et al. | |

(Continued)

FOREIGN PATENT DOCUMENTS

FR         2902589 A1    12/2007

OTHER PUBLICATIONS

Sangsoon Lim et al.: "An Ultra Low Power Medium Access Control Protocol with the Divided preamble Sampling" Ubiquitous Computing Systems Lecture Notes in Computer Science; LNCS, Springer, Berlin, DE, vol. 4239, Jan. 1, 2006, pp. 210-224, XP019045604 ISBN: 978-3-540-46287-3.*

(Continued)

*Primary Examiner* — Jung Park
*Assistant Examiner* — Albert Shih
(74) *Attorney, Agent, or Firm* — David D. Bush; Westman, Champlin & Koehler, P.A.

(57) ABSTRACT

A method is provided for sending a communications signal in a communications network having a plurality of nodes assuming alternating sleeping and waking states and in which a sender node executes a step of sending an initial preamble, prior to sending data to a destination node. The method includes at least one operation of a neighbor node of the sender node relaying the initial preamble, where a relaying operation corresponds to sending a preamble formed from the preamble sent during the preceding relaying operation, the preamble sent during the first relaying operation being formed from the initial preamble, and the at least one relaying operation continuing until the destination node for the data detects the sent preamble.

13 Claims, 3 Drawing Sheets

(56) References Cited

U.S. PATENT DOCUMENTS

2011/0128869 A1* 6/2011 Coleri Ergen et al. ........ 370/252
2012/0244896 A1* 9/2012 Miscopein et al. .......... 455/500

OTHER PUBLICATIONS

Strasser et al.: Mario Strasser et al, "Dwarf: Delay-aWAre Robust Forwarding for Energy-Constrained Wireless Sensor Networks", Distributed Computing in Sensor Systems, Lecture Notes in Computer Science, 2007, vol. 4549/2007, 64-81, DOI: 10.1007/978-3-540-73090-3_5.*

Sangsoon Lim et al, "An Ultra Low Power Medium Access Control Protocol with the Divided Preamble Sampling" Ubiquitous Computing Systems Lecutre Notes in Computer Science; LNCS, Springer, Berlin, DE, vol. 4239, Jan. 1, 2006, pp. 210-224, XPO19045604 ISBN 978-3-540-46287-3.*

Strasser et al, "Dwarf: Delay-aWAre Robust Forwarding for Engergy-Constrained Wireless Sensor Networks", Distributed COmputing in Sensor Systems, Lecture Notes in COmputer Science, 2007, vol. 4549/2007, 64-81, DOI: 10.1007/978-3-540-73090-3_5.*

International Search Report and Written Opinion dated Oct. 29, 2009 for corresponding International Application No. PCT/FR2009/051145, filed Jun. 16, 2009.

Sangsoon Lim et al., "An Ultra Low Power Medium Access Control Protocol with the Divided Preamble Sampling" Umbiquitous Computing Systems Lecture Notes in Computer Science; LNCS, Springer, Berlin, DE, vol. 4239, Jan. 1, 2006 pp. 210-224, XP019045604.

Abdelmalik Bachir et al., "Preamble MAC Protocols with Non-Persistent Receivers in Wireless Sensor Networks" Networking 2008 Ad Hoc and Sensor Networks, Wireless Networks, Next Generation Internet; (Lecture notes in computer science), Springer Berlin Heidelberg, Berlin, Heidelberg, vol. 4982, May 5, 2008, pp. 36-47, XP019088857.

Liu Bing et al., "An adaptive Schedule Medium Access Control for Wireless Sensor Networks" Networking, 2007. ICN '07. Sixth International Conference on, IEEE, PI, Apr. 22, 2007, p. 12, XP031214463.

English Translation of the Written Opinion dated Oct. 29, 2009 for corresponding International Application No. PCT/FR2009/051145, filed Jun. 16, 2009.

* cited by examiner

METHOD OF TRANSMITTING A COMMUNICATIONS SIGNAL

CROSS-REFERENCE TO RELATED APPLICATIONS

This Application is a Section 371 National Stage Application of International Application No. PCT/FR2009/051145, filed Jun. 16, 2009 and published as WO 2010/007274 on Jan. 21, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the present disclosure is the transmission of communications signals in a network consisting of nodes.

BACKGROUND OF THE DISCLOSURE

In a Carrier Sense Multiple Access (CSMA) contention transmission mode, the nodes must continuously monitor the transmission channel either to send a message or to receive a message sent to them.

A sender node having data to send to a destination node sends the data only if the transmission channel is free. This makes it possible to limit collisions between data. Through continuous monitoring, the destination node for the data can detect and receive data that is intended for it.

In this continuous monitoring state, the nodes consume energy unnecessarily.

To alleviate this problem, some transmission modes are based on techniques that put nodes to sleep, for example the technique known as "preamble sampling".

The nodes are asleep for a period of time that has the same duration for all the nodes. They wake up at the end of this period, possibly in an unsynchronized manner.

While it is awake, a node probes the transmission channel to detect transmitted data. If during the period in which it is awake it does not detect data intended for it, the node goes back to sleep. It wakes up again only after a period of sleep has elapsed.

That technique makes it possible to guarantee that a destination node detects data intended for it while it is awake.

To this end, the node sending the data precedes the data with a preamble. The duration of the preamble is at least as long as the period of sleep. Thus when the destination node for the data wakes up it receives the preamble.

Without specific refinement of that transmission mode, all nodes in the vicinity of the node sending data detect the preamble and remain awake until the data has been received. Analyzing the field containing the address of the destination node for the data makes it possible for nodes that are not the destination node to ignore it and go back to sleep.

In a more refined version of that transmission mode, it is possible to insert the address of the destination node into the preamble. Accordingly, when a node detects the preamble, it can tell whether it is the destination node for the data or not. If it is the destination node for the data, it then remains awake throughout the time needed to receive the data, until all the data has been received; if not, it goes back to sleep.

The time for which a node is awake is very short. It corresponds to the minimum time that a node needs in order to detect a preamble. This is very much less than the period of sleep. For example, for the ZigBee transmission mode (see IEEE standard 802.15.4), the duration of sleep is of the order of a few hundred milliseconds for a wakeful period of approximately thirty microseconds.

Using that technique, energy consumption is concentrated essentially at the sender nodes.

Some communications signals are subject to rules with which the nodes must comply. These rules may relate to the activity ratio of a node (the ratio between the sending time and the silence time over a given time period) or the transmission time of a node.

For example, in the European regulations relating to the transmission of ultrawideband (UWB) signals in a certain band of frequencies, the activity ratio is limited to 5% over a period of one second and 0.5% over a period of one hour and a node may not send continuously for more than five milliseconds.

The preamble sampling technique of putting nodes asleep has the drawback of not being applicable to transmission modes of the above type because the duration of the preamble may exceed the allowed sending time.

SUMMARY

A first aspect of an embodiment of the present invention provides a method of sending a communications signal in a communications network comprising a plurality of nodes assuming alternating sleeping and waking states, a sender node executing a step of sending an initial preamble, prior to sending data to a destination node. The method includes at least one operation of a neighbor node of the sender node relaying the initial preamble, where a relaying operation corresponds to sending a preamble formed from the preamble sent during the preceding relaying operation, the preamble sent during the first relaying operation being formed from the initial preamble, and said at least one relaying operation continuing until the destination node for the data detects the sent preamble.

Relaying a preamble makes it possible to send preambles that are small compared to prior art preambles.

Thus rules defined for certain communications modes may be complied with and the energy consumption necessary to send a preamble is divided between the neighbor nodes performing the relay function.

According to a preferred feature, a sent preamble includes information corresponding to the time remaining before sending the data or information corresponding to the number of relaying operations to be effected before sending the data.

Forming a preamble during a relay operation includes modifying the information contained in the preamble sent during the preceding relay that corresponds to the remaining time before sending the data or to the number of relay operations before sending the data. The first preamble is formed by modifying information contained in the initial preamble.

The information contained in a preamble, modified on each relay operation, enables the destination node, when it detects a preamble, to determine when it is going to receive data intended for it. It may then go back to sleep between detecting the preamble and receiving the data. This makes it possible to avoid unnecessary energy consumption by the destination node.

According to a preferred feature, the duration of a preamble is below a predetermined threshold.

The transmission method makes it possible to use preambles of very small size, thus enabling compliance with rules imposed by certain transmission modes.

According to a preferred feature, the sender node sends the data after a waiting time that begins at the end of sending the initial preamble.

The waiting time enables the destination node to receive a preamble and to be ready to receive data.

According to a preferred feature, a neighbor node relaying a preamble repeats the sending of the preamble until another neighbor node takes over sending the preamble or until the destination node has detected a sent preamble.

Relaying of a preamble by a neighbor node until another neighbor node takes over or until the destination node has detected the preamble makes it possible to reduce the risk of loss of data intended for the destination node.

According to preferred features, the sender node remains in listening mode until the destination node detects a sent preamble and, after detecting a sent preamble, the destination node sends an acknowledgement including information indicating that it is awake and is ready to receive data intended for it. After receiving the acknowledgement sent by the destination node, the sender node sends the data without waiting for the end of the waiting time.

Thus the sender node is informed that the destination node has detected a preamble and is awake and is ready to receive data intended for it. The sender node may then send data intended for the destination node without waiting for the waiting time to elapse.

According to preferred features, the method includes management of conflict between at least two neighbor nodes during relaying of a preamble to determine a neighbor node having the highest priority for sending a preamble. A priority neighbor node is a node that has spent the longest time monitoring the preamble sent during the preceding relaying operation between the start of the wakeful period of the node and the end of sending the preamble.

Conflict management makes it possible to optimize the functioning of the method.

An embodiment of the invention further provides a node in a communications network comprising a plurality of nodes assuming alternating sleeping and waking states, a sender node executing a step of sending an initial preamble, prior to sending data to a destination node. A node of an embodiment of the invention includes means for relaying the initial preamble, where a relaying operation corresponds to sending a preamble formed from the preamble sent during the preceding relaying operation, the preamble sent during the first relaying operation being formed from the initial preamble, and relaying continuing until the destination node for the data detects the sent preamble.

The advantages defined for the method of an embodiment of the invention apply equally to the node of an embodiment of the invention.

An embodiment of the invention further provides a communications network comprising a plurality of nodes assuming alternating sleeping and waking states, a sender node executing a step of sending an initial preamble, prior to sending data to a destination node. A method of an embodiment of the invention includes at least one node for relaying the initial preamble, where a relaying operation corresponds to sending a preamble formed from the preamble sent during the preceding relaying operation, the preamble sent during the first relaying operation being formed from the initial preamble, and relaying continuing until the destination node for the data detects the sent preamble.

An embodiment of the invention further provides a computer program including instructions for executing the method described above when the program is executed by a computer.

BRIEF DESCRIPTION OF THE DRAWINGS

Other features and advantages become apparent on reading the description of preferred implementations of a communications signal transmission method given with reference to the appended figures, in which.

DETAILED DESCRIPTION OF ILLUSTRATIVE EMBODIMENTS

The following description of the prior art and of illustrative embodiments of the invention applies to a communications network including a plurality of nodes. The communications signal sent from a sender node to a destination node via neighbor nodes may correspond to a preamble or to data. The transmission mode used relies on a preamble sampling technique in which nodes are put to sleep.

Figure 1:
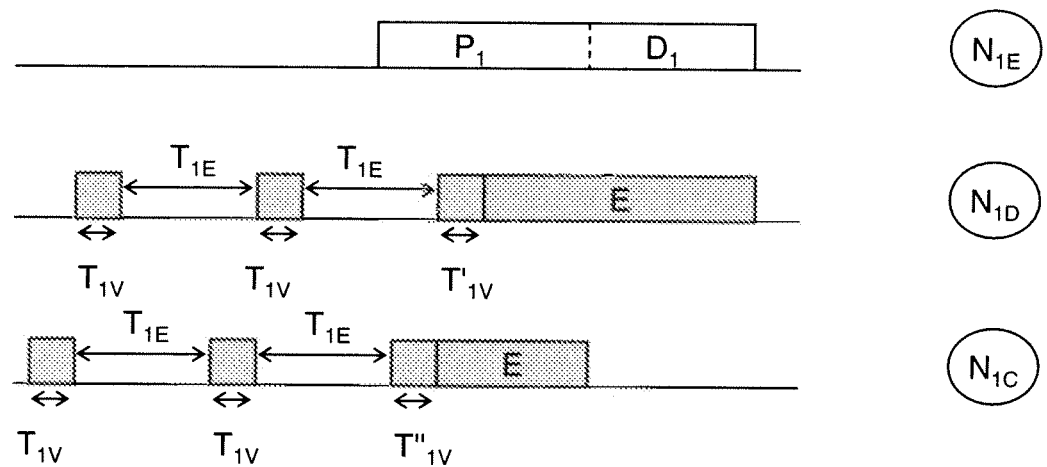
FIG. 1 represents a prior art transmission mode based on a technique using a preamble sampling protocol in which nodes are put to sleep.

FIG. 1 represents one prior art mode of sending a communications signal based on a preamble sampling technique in which nodes are put to sleep.

A sender node $N_{1E}$ sends data $D_1$ to a destination node $N_{1D}$. This step of sending data is preceded by a step of sending a preamble $P_1$.

Consider a transmission mode in which the preamble $P_1$ includes the identification of the destination node $N_{1D}$.

Given the transmission mode used, the destination node $N_{1D}$ is put to sleep during periods of sleep $T_E$. The destination node $N_{1D}$ wakes up periodically for short time periods $T_{1V}$. If during a wakeful period, for example the period $T'_{1V}$ represented in FIG. 1, the destination node $N_{1D}$ detects a preamble $P_1$ identifying it as the destination node of the data $D_1$, it stays in a wakeful state E during reception of the data $D_1$ and until all the data has been received.

Like the destination node $N_{1D}$, the node $N_{1C}$ is asleep during periods of sleep $T_E$ and awake during short time periods $T_{1V}$. If during a wakeful period, for example the period $T'_{1V}$ represented in FIG. 1, the node $N_{1C}$ detects that the preamble $P_1$ does not identify it as the destination node of the data $D_1$, it remains in the wakeful state E until the end of sending the preamble $P_1$, and then goes back to sleep.

As shown in FIG. 1, the time for a sender node $N_E$ to send a preamble $P_1$ is longer than the time period $T_E$ for which the destination node $N_{1D}$ is asleep. This mode of operation makes it possible to ensure that the destination node $N_{1D}$ receives data intended for it, but the consequence of this is high energy consumption by the sender node $N_E$ in order to send the preamble $P_1$.

Figure 2:
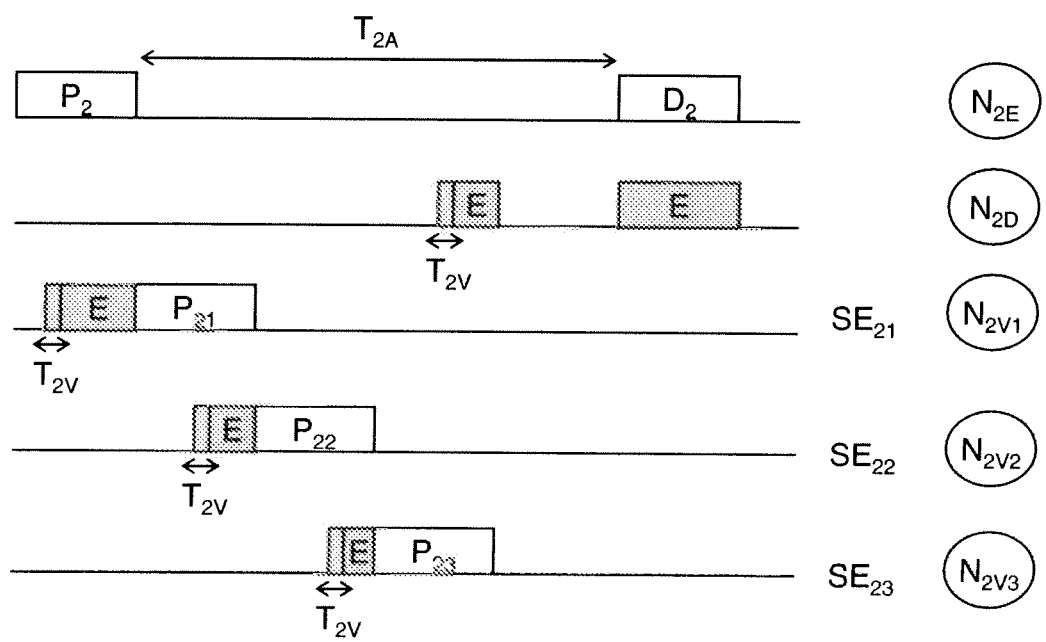
FIG. 2 represents a transmission mode of a first implementation of an embodiment of the invention based on a preamble sampling technique in which nodes are put to sleep.

FIG. 2 represents a transmission mode of a first implementation of an embodiment of the invention based on a preamble sampling technique in which nodes are put to sleep.

A sender node $N_{2E}$ sends data $D_2$ to a destination node $N_{2D}$. This sending step is preceded by a step of sending an initial preamble $P_2$ including the identification of the destination node $N_{2D}$.

The preamble $P_2$ may also include:
the address of the destination node $N_{2D}$;
the time remaining before sending the data $D_2$;
the address of the sender node $N_{2E}$.

This information may be put at the end of the preamble or repeated throughout transmission of the preamble.

The duration of the initial preamble $P_2$ is very much shorter than the duration of the prior art preamble $P_1$ and consequently very much shorter than the period for which a node is asleep. For example, while the duration of the preamble $P_1$ is at least several hundred milliseconds, the duration of the initial preamble $P_2$ is of the order of a few milliseconds. To satisfy UWB system rules applied in some countries, the duration of the initial preamble $P_2$ is less than five milliseconds, for example.

According to an embodiment of the invention, the initial preamble $P_2$ is sent during at least one substep in which the initial preamble $P_2$ is relayed at least once by a neighbor node of the sender node $N_{2E}$.

The information included in the initial preamble $P_2$ concerning the time remaining before sending the data $D_2$ may then be replaced by the number of relay operations to be effected before sending the data $D_2$.

By way of non-limiting example of the invention, FIG. 2 shows three substeps $SE_{21}$, $SE_{22}$, and $SE_{23}$ executed respectively by the neighbor nodes $N_{2V1}$, $N_{2V2}$, and $N_{2V3}$, of the sender node $N_{2E}$.

During a substep $SE_{21}$, the neighbor node $N_{2V1}$, awake for a time period $T_{2V}$ while the initial preamble $P_2$ is being sent by the sender node $N_{2E}$, detects the preamble $P_2$. The neighbor node $N_{2V1}$ remains in the wakeful state E until the sender node $N_{2E}$ has completed sending the initial preamble $P_2$. The neighbor node $N_{2V1}$ then in turn sends a preamble $P_{21}$.

The preamble $P_{21}$ sent by the node $N_{2V1}$ is formed from the initial preamble $P_2$ sent by the sender node $N_{2E}$. At least the information concerning the time remaining before sending the data $D_2$ or the number of relay operations to be effected before sending the data $D_2$ is modified and updated by the node $N_{2V1}$.

During a substep $SE_{22}$, the neighbor node $N_{2V2}$, awake for a time period $T_{2V}$ while the preamble $P_{21}$ is being sent by the neighbor node $N_{2V1}$, detects the preamble $P_{21}$. The neighbor node $N_{2V2}$ remains in the wakeful state E until the neighbor node $N_{2V1}$ has completed sending the preamble $P_{21}$. The neighbor node $N_{2V2}$ then in turn sends a modified preamble $P_{22}$. The preamble $P_{22}$ is formed from the preceding preamble $P_{21}$ by modifying at least the information concerning the time remaining before sending the data $D_2$ or the number of relay operations to be effected before sending the data $D_2$.

During a substep $SE_{23}$, the neighbor node $N_{2V3}$, awake for a time period $T_{2V}$ while the preamble $P_{22}$ is being sent by the neighbor node $N_{2V2}$, detects the preamble $P_{22}$. The neighbor node $N_{2V3}$ remains in the wakeful state E until the neighbor node $N_{2V2}$ has completed sending the preamble $P_{22}$. The neighbor node $N_{2V3}$ then sends in turn a modified preamble $P_{23}$.

The sender node $N_{2E}$ sends the data $D_2$ at the end of a waiting time $T_{2A}$ at least equal to the time period for which a node is put to sleep.

The waiting time $T_{2A}$ is defined by the sender node. The sender node aims to send the data as quickly as possible. However, the waiting time $T_{2A}$ depends among other things on the period of sleep of the nodes and is not less than that period of sleep.

If the destination node $N_{2D}$ is awake while a preamble formed from the initial preamble $P_2$ is being relayed by a neighbor node of the sender node, it is able to determine that the data $D_2$ is intended for it and at what time it must be sent. The destination node $N_{2D}$ can therefore go back to sleep and then return to the wakeful state E at the scheduled time for receiving the data $D_2$.

Figure 3:
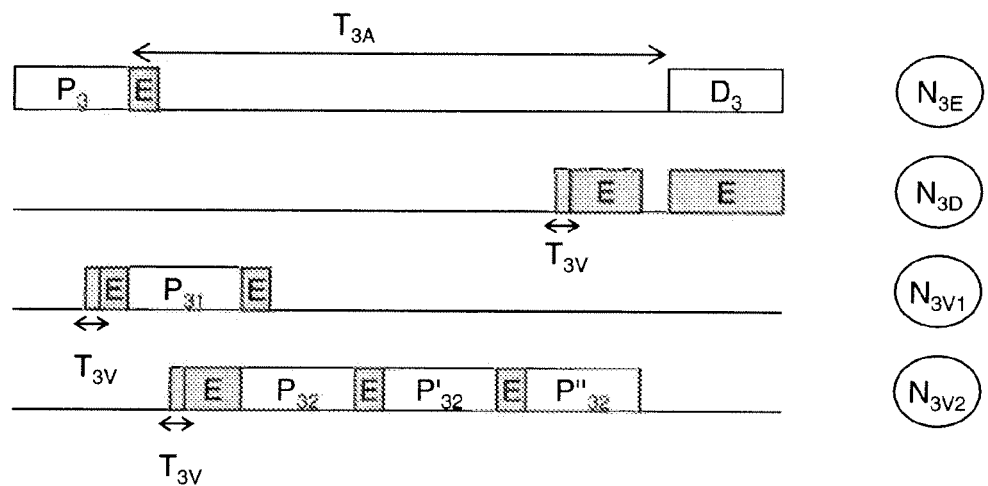
FIG. 3 represents a transmission mode of a second implementation of an embodiment of the invention based on a preamble sampling technique in which nodes are put to sleep.

FIG. 3 represents a transmission mode of a second implementation of an embodiment of the invention based on a preamble sampling technique in which nodes are put to sleep.

In this implementation a node that sends a preamble, whether it is the sender node or a neighbor node of the sender node, checks that the preamble is received by another node, which may be a neighbor node or the destination node.

Thus the sender node and the neighbor nodes that send a preamble in succession continue to monitor sending until they are sure that the preamble that they have sent has been received and retransmitted by another node, i.e. until the preamble has been relayed by another node.

If the preamble has been relayed by another node, the node that was previously sending it goes back to sleep. A node sending a preamble continues to send it until another node takes over.

The number of times a given node sends the preamble may depend on the time at which another node receives it or on rules defined by the regulations or transmission standard concerned, for example the sending time of a node.

The advantage of this implementation is that it reduces the probability of losing data.

Referring to FIG. 3, a sender node $N_{3E}$ sends data $D_3$ to a destination node $N_3D$.

As in the implementation of an embodiment of the invention described above, this sending step is preceded by a step of sending an initial preamble $P_3$ during which a plurality of neighbor nodes relay one another.

After sending the initial preamble $P_3$, the sender node $N_{3E}$ remains in the wakeful state E and monitors sending to determine whether another node has received the initial preamble $P_3$ and then sent a preamble formed from it.

The neighbor node $N_{3V1}$, awake during a time period $T_{3V}$ while the sender node $N_{3E}$ is sending the initial preamble $P_3$, detects the initial preamble $P_3$. The neighbor node $N_{3V1}$ remains in the wakeful state E until the sender node $N_{3E}$ has completed sending the preamble $P_3$. On completion of sending of the preamble $P_3$ by the sender node $N_{3E}$, the neighbor node $N_{3V1}$ in turn sends a modified preamble $P_{31}$.

As described for the first implementation of an embodiment of the invention, the preamble $P_{31}$ sent by the node $N_{3V1}$ is modified relative to the initial preamble $P_3$ sent by the sender node $N_{3E}$ at least in so far as the information about the time remaining before sending the data $D_3$ or the number of relay operations to be effected before sending the data $D_3$ is concerned. This information is updated by the node $N_{3V1}$.

Since the sender node $N_{3E}$ is in the wakeful state E and in listening mode while the neighbor node $N_{3V1}$ is sending the preamble $P_{31}$, the sender node $N_{3E}$ is informed that the initial preamble $P_3$ has been relayed. The sender node $N_{3E}$ can then go back to sleep.

In turn, after sending the preamble $P_{31}$, the neighbor node $N_{3V1}$ remains in the wakeful state E and in listening mode to determine whether another node has received and then sent a preamble formed from the preamble $P_{31}$.

The neighbor node $N_{3V2}$, awake during a time $T_{3V}$ while the neighbor node $N_{3V1}$ is sending the preamble $P_{31}$, detects the preamble $P_{31}$. The neighbor node $N_{3V2}$ remains in the wakeful state E until the neighbor node $N_{3V1}$ has completed sending the preamble $P_{31}$.

On completion of sending of the preamble $P_{31}$ by the neighbor node $N_{3V1}$, the neighbor node $N_{3V2}$ in turn sends a preamble $P_{32}$ formed from the preamble $P_{31}$.

After sending the preamble $P_{32}$, the neighbor node $N_{3V2}$ monitors sending to determine whether another node has received and then sent a preamble formed from the preamble $P_{32}$.

If no node has relayed the modified preamble $P_{32}$, the neighbor node $N_{3V2}$ sends the preambles $P'_{32}$ and $P''_{32}$ successively until another node receives the last preamble sent (here this is the destination node, see FIG. 3).

The preamble $P'_{32}$ is modified relative to the preamble $P_{32}$ at least in respect of the information about the time remaining before sending the data $D_3$ or the number of relay operations to be effected before sending the data $D_3$. The same applies to the preamble $P''_{32}$ in relation to the preamble $P'_{32}$.

At the end of a time period $T_3A$ that is not less than the period for which a node is asleep, the sender node $N_{3E}$ sends the data $D_3$.

The number of neighbor nodes relaying a preamble formed from a preamble sent during a preceding relay operation and the number of times a preamble is sent by the same node (see FIG. 3) are merely illustrative of an embodiment of the invention and are not to be considered as limiting the invention.

Figure 4:
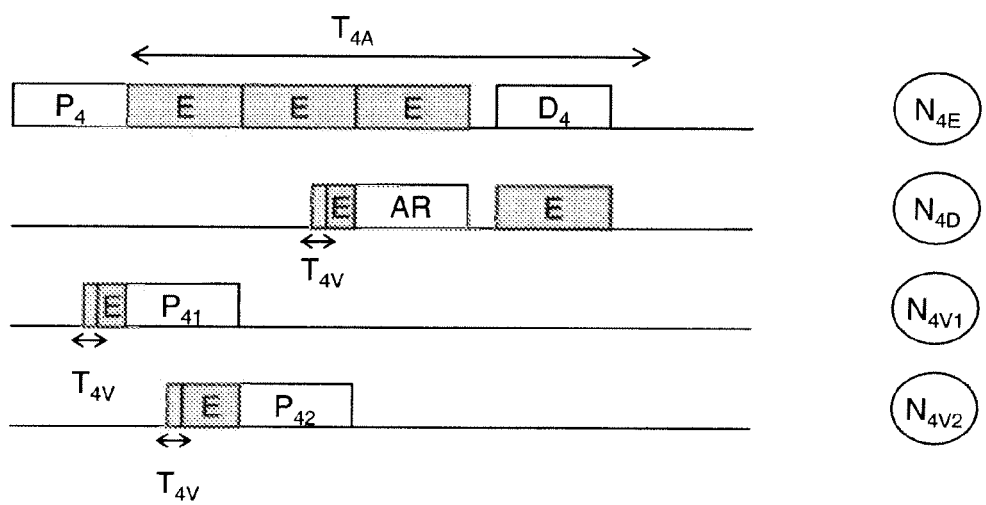
FIG. 4 represents a transmission mode of a third implementation of an embodiment of the invention based on a preamble sampling technique in which nodes are put to sleep.

FIG. 4 represents a transmission mode of a third implementation of an embodiment of the invention based on a preamble sampling technique in which nodes are put to sleep.

For this implementation, the sender node monitors the successive relay operations during sending of the successively modified preamble until it determines that the destination node has received a preamble.

As mentioned above, the sent preamble includes information including the address of the destination node, the address of the sender node, the time remaining before sending the data, etc.

When the destination node for the data receives the preamble identifying it as the destination node, it may in turn send an acknowledgement including information indicating that it is awake and ready to receive the data intended for it.

Referring to FIG. 4, a sender node $N_{4E}$ sends data $D_4$ to a destination node $N_{4D}$.

This sending step is preceded by a step of sending an initial preamble $P_4$ during which a plurality of neighbor nodes relay one another.

After it has sent the initial preamble $P_4$, the sender node $N_{4E}$ remains in the wakeful state E and in listening mode.

The neighbor node $N_{4V1}$, awake for a time period $T_{4V}$ while the preamble $P_4$ is being sent by the sender node $N_{4E}$, detects the initial preamble $P_4$. The neighbor node $N_{4V1}$ remains in the wakeful state E until the sender node $N_{4E}$ has completed sending the initial preamble $P_4$. On completion of sending of the initial preamble $P_4$ by the sender node $N_{4E}$, the neighbor node $N_{4V1}$ in turn sends a modified preamble $P_{41}$.

As in the two implementations of embodiments of the invention described above, the preamble $P_{41}$ sent by the node $N_{4V1}$ is modified relative to the initial preamble $P_4$ sent by the sender node $N_{4E}$, at least concerning the information about the time remaining before sending the data $D_4$ or the number of relay operations to be effected before sending the data $D_4$. This information is updated by the node $N_{4V1}$.

Since the sender node $N_{4E}$ is in the wakeful state E and in listening mode when the neighbor node $N_{4V1}$ sends the preamble $P_{41}$, the sender node $N_{4E}$ is informed that the initial preamble $P_4$ has been relayed.

The neighbor node $N_{4V2}$, awake during a time period $T_{4V}$ while the preamble $P_{41}$ is being sent by the neighbor node $N_{4V1}$, detects the preamble $P_{41}$. The neighbor node $N_{4V2}$ remains in the wakeful state E until the neighbor node $N_{4V1}$ has completed sending the preamble $P_{41}$. On completion of sending of the preamble $P_{41}$ by the neighbor node $N_{4V1}$, the neighbor node $N_{4V2}$ in turn sends a modified preamble $P_{42}$.

Because the sender node $N_{4E}$ is still in the wakeful state E and in listening mode while the neighbor node $N_{4V2}$ is sending the preamble $P_{42}$, the sender node $N_{4E}$ is informed that a new relay operation has been effected.

The destination node $N_{4D}$, awake for a time period $T_{4V}$ while the preamble $P_{42}$ is being sent by the neighbor node $N_{4V2}$, detects the preamble $P_{42}$. By analyzing the content of the preamble $P_{42}$ it determines that it is the destination for the data. In turn, it then sends an acknowledgement AR that includes information specifying that it has been activated and that it is ready to receive data intended for it. The acknowledgement AR may be the last preamble sent after modification by the destination node $N_{4D}$.

Since the sender node $N_{4E}$ is still in the wakeful state E and in listening mode, it receives the acknowledgement AR sent by the destination node $N_{4D}$. The sender node $N_{4E}$ may then send the data intended for the destination node $N_{4D}$ without waiting for the waiting time $T_{4A}$ to elapse that was initially provided for sending the data.

This implementation of an embodiment of the invention has the advantage of reducing the time $T_{4A}$ that the sender node $N_{4E}$ needs to wait to send data $D_4$ for the destination node $N_{4D}$.

This implementation of an embodiment of the invention also has the advantage of enabling the sender node $N_{4E}$ to determine the wakeful time period $T_{4V}$ for each of its neighbor nodes. The sender node $N_{4E}$ can then construct a table of wakeful time periods $T_{4V}$ for each of its neighbor nodes from information collected after each of its neighbor nodes relays a preamble. This enables the sender node $N_{4E}$ to optimize the future sending of data addressed to one of its neighbor nodes.

An embodiment of the invention also provides conflict management when relaying a preamble.

This entails determining which neighbor node is to relay the preamble when at least two neighbor nodes have received the same preamble and are ready to relay it.

Determining this takes account of the wakeful time of each of the neighbor nodes concerned relative to sending the preamble.

The earlier the wakeful time of a neighbor node during sending of the preamble, the higher is the priority of that node for relaying the preamble.

The preamble sending time is defined beforehand to satisfy rules including rules defined by a sending mode or other constraints.

Consequently, a neighbor node is able to measure the residual time between the time at which it wakes up and receives the preamble and the corresponding time at the end of sending the preamble.

To prevent conflict with another neighbor node, a neighbor node that has detected the preamble goes to listening mode between the end of sending the preamble and the time at which it must itself send the preamble. If during this waiting time it does not receive the preamble, this means that another neighbor node has not sent it and that it is itself the neighbor node with the highest priority for relaying the preamble.

The waiting time before a node sends the preamble is inversely proportional to the time during which it was receiving the preamble. To be certain that the preamble is really sent, the waiting time is also less than a predetermined threshold.

Figure 5:
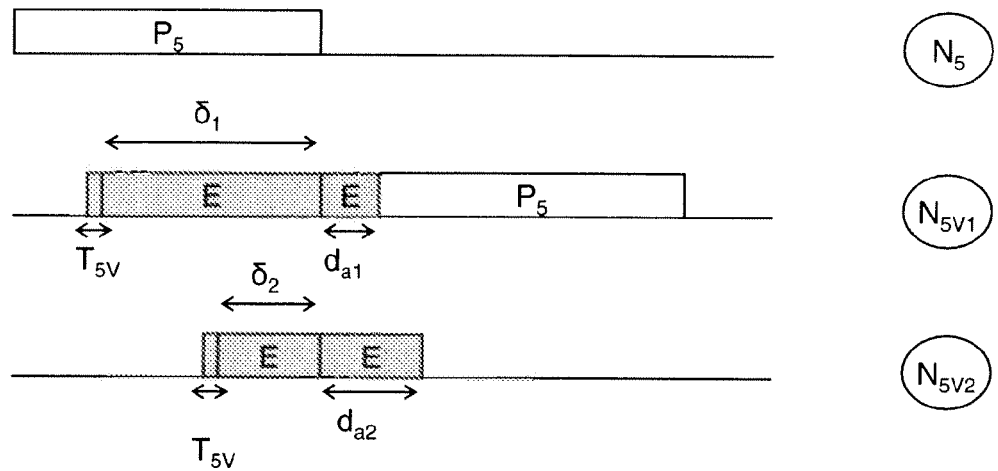
FIG. 5 represents the management of conflict between two neighbor nodes adapted to send a preamble.

FIG. 5 represents management of conflict between two neighbor nodes able to send a preamble.

A node $N_5$ sends a preamble $P_5$.

The node $N_5$ may be a sender node that sends an initial preamble $P_5$ or a neighbor node that relays a preamble.

Two neighbor nodes $N_{5V1}$ and $N_{5V2}$ receive the preamble $P_5$ during their respective wakeful times $T_{5V}$. The neighbor nodes $N_{5V1}$ and $N_{5V2}$ then monitor the preamble $P_5$ until sending thereof ends at respective times $\delta_1$ and $\delta_2$.

The neighbor node $N_{5V1}$ that monitors sending of the preamble $P_5$ for longer ($\delta_1$ being greater than $\delta_2$) is the node having the highest priority for sending the preamble $P_5$.

The waiting time $d_{a1}$ of the node $N_{5V1}$ before it in turn sends the preamble $P_5$ is less than the waiting time $d_{a2}$ of the node $N_{5V2}$.

During the waiting time $d_{a2}$, the node $N_{5V2}$ becomes aware that the preamble has been sent. It therefore does not need to send it and may go back to sleep.

Instead of going back to sleep, the node $N_{5V2}$ may equally monitor successive relays and intervene to send the preamble if relaying does not proceed correctly, notably if it is interrupted.

The number of nodes considered above to describe conflict management is merely illustrative and is not limiting on the invention.

Figure 6:
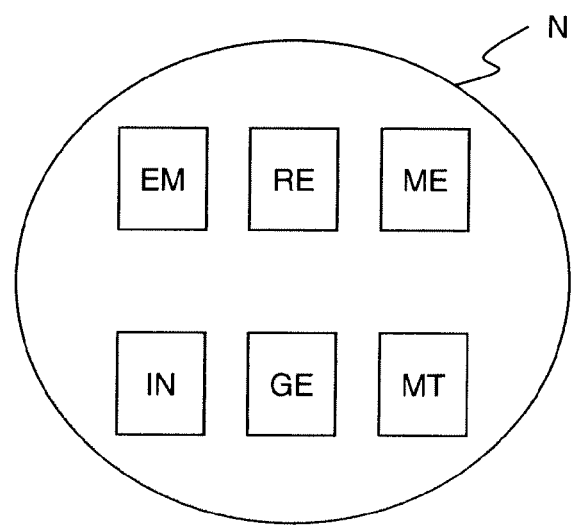
FIG. 6 is a functional diagram of a node.

FIG. 6 is a functional diagram of a node.

A node N, whether it is a sender node, a destination node, or a neighbor node, includes a sender module EM. This sender module EM of a node makes it possible to generate a communications signal. As described above, the generated signal may correspond to a preamble or to data.

A node N also includes a module RE for receiving a communications signal similar to that described above.

A node N further includes a module ME for monitoring a transmission channel conveying communications signals corresponding to a preamble or to data. The monitoring module ME may be incorporated in the receiver module RE.

A node N further includes a module IN for interpreting the content of a preamble. The module IN may in particular read the information contained in a preamble.

A node N further includes a generator module GE for generating information to be integrated into a preamble and for modifying the content of a preamble.

A node N further includes means MT for measuring time.

A node N further includes a control unit, not shown, connected to each of the modules EM, RE, ME, IN, GE and to the means MT and adapted to control their operation.

The modules and means described above are adapted to execute the steps of the method described above.

Thus a node may relay the sending of a preamble using the sender module EM. Relaying corresponds to sending a preamble formed from the preamble sent during a preceding relay operation. A preamble is formed by the generator module GE. The preamble sent in the first relaying operation is formed from the initial preamble and relaying continues until the destination node of the data detects the sent preamble.

The modules EM, RE, ME, IN, GE and the means MT may be software modules forming a computer program. An embodiment of the invention therefore also provides to a computer program comprising software instructions for execution of the method described above by a node.

The software module may be stored in or transmitted by a data medium. This may be a hardware storage medium, for example a CD-ROM, a floppy disk or a hard disk, or a transmissible medium such as an electrical, optical, or radio signal.

An embodiment of the invention may be used in ad hoc networks and more particularly in networks of sensors. The sensors, corresponding to the nodes, may be temperature, pressure, etc. probes.

An exemplary embodiment of the disclosure proposes a preamble sampling transmission technique that complies with transmission rules as well as managing the energy consumption of the nodes.

Although the present disclosure has been described with reference to one or more examples, workers skilled in the art will recognize that changes may be made in form and detail without departing from the scope of the disclosure and/or the appended claims.

The invention claimed is:

1. A method of sending a communications signal in a communications network comprising a plurality of nodes assuming alternating sleeping and waking states, a sender node executing a step of sending an initial preamble, prior to sending data to a destination node, said destination node being a 1-hop neighbor of said sender node, wherein the initial preamble is shorter than a duration for which the destination node is asleep in the sleeping state and the method comprises:
   at least one operation of a 1-hop neighbor node of the sender node relaying the initial preamble to another 1-hop neighbor node of the sender node, where the relaying operation comprises sending a preamble formed from the preamble sent during a preceding relaying operation, the preamble sent during a first relaying operation being formed from the initial preamble, and
   continuing said at least one relaying operation until the destination node for the data detects the sent preamble.

2. A method according to claim 1, wherein the sent preamble includes information corresponding to the time remaining before sending the data or information corresponding to the number of relaying operations to be effected before sending the data.

3. A method according to claim 1, wherein the duration of a preamble is below a predetermined threshold.

4. A method according to claim 1, wherein the sender node sends the data after a waiting time that begins at the end of sending the initial preamble.

5. A method according to claim 1, wherein a neighbor node relaying a preamble repeats the sending of the preamble until another neighbor node takes over sending the preamble or until the destination node has detected the sent preamble.

6. A method according to claim 1, wherein the sender node remains in a listening mode until the destination node detects the sent preamble.

7. A method according to claim 6, wherein, after detecting the sent preamble, the destination node sends an acknowledgement including information indicating that the destination node is awake and is ready to receive data intended for the destination node.

8. A method according to claim 7, wherein:
   the sender node sends the data after a waiting time that begins at the end of sending the initial preamble; and
   after receiving the acknowledgement sent by the destination node, the sender node sends the data without waiting for the end of the waiting time.

9. A method according to claim 1, wherein the method includes managing conflict between at least two neighbor nodes during relaying of the preamble to determine a neighbor node having the highest priority for sending the preamble.

10. A method according to claim 9, wherein the priority neighbor node is a node that has spent the longest time monitoring the preamble sent during the preceding relaying operation between the start of the wakeful period of the node and the end of sending the preamble.

11. A node in a communications network comprising a plurality of nodes assuming alternating sleeping and waking states, a sender node executing a step of sending an initial preamble prior to sending data to a destination node, said destination node being a 1-hop neighbor of said sender node, wherein the initial preamble is shorter than a duration for which the destination node is asleep in the sleeping state and the node in the communications network comprises:

means for relaying the initial preamble to another 1-hop node of the sender node, where a relaying operation corresponds to sending a preamble formed from the preamble sent during a preceding relaying operation, the preamble sent during a first relaying operation being formed from the initial preamble; and means for continuing the relaying operation until the destination node for the data detects the sent preamble.

12. A communications network comprising:

a plurality of nodes assuming alternating sleeping and waking states and including a sender node, a destination node, which is a 1-hop neighbor of said sender node, and at least one relaying node, which is a 1-hop neighbor node of the sender node, the sender node executing a step of sending an initial preamble prior to sending data to a destination node, wherein the initial preamble is shorter than a duration for which the destination node is asleep in the sleeping state, the at least one relaying node being configured to perform a relaying operation to relay the initial preamble to another 1-hop node of the sender node, where the relaying operation comprises sending a preamble formed from the preamble sent during a preceding relaying operation, the preamble sent during a first relaying operation being formed from the initial preamble, and wherein the at least one relaying node is configured to continue relaying until the destination node for the data detects the sent preamble.

13. A hardware storage medium comprising a computer program stored thereon and including instructions for executing a method of sending a communications signal in a communications network comprising a plurality of nodes assuming alternating sleeping and waking states, when the program is executed by a computer, wherein a sender node executes a step of sending an initial preamble, prior to sending data to a destination node, which is a 1-hop neighbor of the sender node, and wherein the initial preamble is shorter than a duration for which the destination node is asleep in the sleeping state and the method comprises:

at least one operation of a 1-hop neighbor node of the sender node relaying the initial preamble to another 1-hop neighbor node of the sender node, where the relaying operation comprises sending a preamble formed from the preamble sent during a preceding relaying operation, the preamble sent during a first relaying operation being formed from the initial preamble, and continuing said at least one relaying operation until the destination node for the data detects the sent preamble.

\* \* \* \* \*